(12) United States Patent
Yamamoto et al.

(10) Patent No.: US 7,285,891 B2
(45) Date of Patent: Oct. 23, 2007

(54) ARMATURE CORE OF ROTATING ELECTRIC MACHINE

(75) Inventors: Kazuyuki Yamamoto, Tokyo (JP); Kei Yonemori, Tokyo (JP)

(73) Assignee: Mitsubishi Denki Kabushiki Kaisha, Chiyoda-Ku, Tokyo (JP)

( * ) Notice: Subject to any disclaimer, the term of this patent is extended or adjusted under 35 U.S.C. 154(b) by 180 days.

(21) Appl. No.: 10/549,185

(22) PCT Filed: Mar. 3, 2004

(86) PCT No.: PCT/JP2004/002658

§ 371 (c)(1),
(2), (4) Date: Sep. 16, 2005

(87) PCT Pub. No.: WO2005/086318

PCT Pub. Date: Sep. 15, 2005

(65) Prior Publication Data

US 2007/0035199 A1 Feb. 15, 2007

(51) Int. Cl.
*H02K 1/00* (2006.01)
(52) U.S. Cl. .................. 310/216; 310/218; 310/269
(58) Field of Classification Search ........ 310/216–218, 310/258–259, 265, 269
See application file for complete search history.

(56) References Cited

U.S. PATENT DOCUMENTS 3,495,106 A 2/1970 Lenders (Continued)

FOREIGN PATENT DOCUMENTS

JP  48-26482  8/1973

(Continued)

OTHER PUBLICATIONS

*International Search Report dated Jun. 15, 2004.
*Written Opinion dated Jun. 15, 2004.

*Primary Examiner*—Thanh Lam
(74) *Attorney, Agent, or Firm*—Buchanan Ingersoll & Rooney PC

(57) ABSTRACT

A rotating electric machine armature core (1) is configured by combining such a number of magnetic tooth sections (2) that corresponds to the number of magnetic poles, each of the magnetic tooth sections (2) including a plurality of first sheet members (6) each of which includes a magnetic tooth portion (3) formed at one end and a root portion (5) formed at the other end with an end face of the root portion (5) having a prescribed external shape, and at least one second sheet member (10) inserted between the individual first sheet members (6) in a laminating direction thereof at a location different from the locations of the other sheet members, the second sheet member (10) including the magnetic tooth portion (3) formed at one end and an overlapping portion (9) formed at the other end, the overlapping portion (9) forming a back yoke portion (8) together with the root portion (5) with a through hole (7) formed at a specified position in the overlapping portion (9), the overlapping portion (9) jutting out from the root portion (5) in such a manner that the overlapping portion (9) can fit on the end face of the root portion (5) of the first sheet member (6), wherein the magnetic tooth sections (2) are combined in a radial form with the through holes (7) in the individual overlapping portions (9) aligned at the same location.

4 Claims, 11 Drawing Sheets

U.S. PATENT DOCUMENTS

| | | | | |
|---|---|---|---|---|
| 4,616,151 A | * | 10/1986 | Pryjmak | 310/216 |
| 6,034,461 A | * | 3/2000 | Sun | 310/218 |
| 6,718,616 B2 | * | 4/2004 | Fukui et al. | 29/596 |
| 2003/0127933 A1 | * | 7/2003 | Enomoto et al. | 310/194 |
| 2007/0040467 A1 | * | 2/2007 | Gu | 310/216 |

FOREIGN PATENT DOCUMENTS

| | | |
|---|---|---|
| JP | 7-3253 U | 1/1995 |
| JP | 11-146581 A | 5/1999 |
| JP | 11-155263 A | 6/1999 |

* cited by examiner (A)

(B)

(C)

(D)

ARMATURE CORE OF ROTATING ELECTRIC MACHINE

This disclosure is based upon International Application No. PCT/JP2004/002658, filed Mar. 3, 2004, the contents of which are incorporated herein by reference.

TECHNICAL FIELD

The present invention relates to an armature core of a rotating electric machine, the armature core having a split structure of which components can be easily joined and fixed together to form a single body.

BACKGROUND ART

An example of a conventional rotating electric machine armature core is shown in Japanese Laid-open Patent Application No. 1999-155263, in which the armature core is structured by winding coils around tooth portions of a laminated iron core which is formed by laminating elemental iron core steel sheets having a plurality of tooth portions which are connected by joint parts and arranged in an annular shape, and then fixedly joining the elemental iron core steel sheets to a yoke portion located on an inner peripheral parts or an outer peripheral parts of the tooth portions to form a single body by compressing and deforming the laminated iron core to a predetermined outer diameter from outer peripheral directions thereof.

Another example is shown in Japanese Laid-open Patent Application No. 1999-146581, in which the armature core is structured by winding armature coils around coil-winding pole portions of a plurality of divided cores, each of which includes a coil-winding pole portion and a divided yoke portion, and then fixedly joining the divided yoke portions of the individual divided cores to form a single body with the divided yoke portions fixed to a boss portion under conditions where joint surfaces of the divided yoke portions are magnetically connected to one another.

In the conventional rotating electric machine armature core described above with reference to Japanese Laid-open Patent Application No. 1999-155263, the tooth portions are fixedly joined to the yoke portion by compressing and deforming the joint parts to form a single body after winding the coils around the tooth portions which are connected to the yoke portion via the joint parts. Therefore, in a case where the core is made compact, for example, there has been a problem that it is structurally difficult to form a space for accommodating the joint parts before and after the joint parts are deformed by compression, for instance, and the scope of application of this structure is limited.

In the Japanese Laid-open Patent Application No. 1999-146581, on the other hand, the individual divided cores are fixedly joined by fixing the same to a boss to form a single body after winding the coils around the coil-winding pole portions of the individual divided cores. Thus, although the scope of application of this structure is not limited, there has been a problem that work for fixing the individual divided cores to the boss one by one is so complex that efficiency of assembly work for fixedly joining the divided cores into a single body decreases in this approach.

This invention has been made to solve the aforementioned problems. Accordingly, it is an object of the invention to provide a rotating electric machine armature core which makes it possible to achieve an improvement in the efficiency of assembly work for fixedly joining separate elements into a single body without limiting the scope of application of the armature core.

DISCLOSURE OF THE INVENTION

A first rotating electric machine armature core according to the present invention includes such a number of magnetic tooth sections that corresponds to the number of magnetic poles, each of the magnetic tooth sections being formed by laminating a specific number of sheet members each of which has a magnetic tooth portion formed at one end and a back yoke portion formed at the other end, the magnetic tooth sections being combined in a radial form centering on the other end side and fixedly joined to together form a single body. Each of the magnetic tooth sections includes a plurality of first sheet members each of which includes the magnetic tooth portion formed at one end and a root portion formed at the other end with an end face of the root portion having a prescribed external shape, and at least one second sheet member inserted between the individual first sheet members in a laminating direction thereof at a location different from the locations of the other sheet members, the second sheet member including the magnetic tooth portion formed at one end and an overlapping portion formed at the other end, the overlapping portion forming the back yoke portion together with the root portion with a through hole formed at a specified position in the overlapping portion, the overlapping portion jutting out from the root portion in such a manner that the overlapping portion can fit on the end face of the root portion of the first sheet member. This rotating electric machine armature core is configured by combining the magnetic tooth sections with the through holes in the individual overlapping portions aligned at the same location.

This structure makes it possible to provide a rotating electric machine armature core which allows for an improvement in the efficiency of assembly work for fixedly joining separate elements into a single body without limiting the scope of application of the armature core.

A second rotating electric machine armature core according to the present invention includes a first magnetic tooth section including first sheet members each of which includes a ring like portion having a through hole at a central part and a plurality of magnetic tooth portions formed to extend from around the aforesaid ring like portion at specific intervals along a circumferential direction, and second sheet members each of which includes a second ring like portion, a plurality of magnetic tooth portions formed to extend from around the aforesaid second ring like portion at the specific intervals along the circumferential direction, and a cutout portion opening outward at a middle position along the circumferential direction between adjacent two of the aforesaid magnetic tooth portions, the aforesaid cutout portion being formed by cutting out a central part of the aforesaid second ring like portion over an area large enough to encompass the through hole formed in the aforesaid first sheet members, wherein the aforesaid first magnetic tooth section is formed by laminating specific numbers of the aforesaid first and second sheet members in such a manner that the individual magnetic tooth portions of the aforesaid first and second laminated members are aligned and the cutout portion of the aforesaid second sheet member exists at least at one location between the aforesaid adjacent magnetic tooth portions, and a plurality of second magnetic tooth sections each including third sheet members each of which includes a magnetic tooth portion formed at one end and an end portion formed at the other end, the end portion being capable of fitting on an outer peripheral surface of the ring like portion of the aforesaid first sheet member, and fourth sheet members each of which includes a magnetic tooth portion formed at one end and an overlapping portion formed at the other end with a through hole formed at a specified position in the overlapping portion, the overlapping portion being capable of fitting in the cutout portion of the aforesaid second sheet member, wherein each of the aforesaid second magnetic tooth sections is formed by laminating the specific numbers of the aforesaid third and fourth sheet members in such a manner that the individual magnetic tooth portions of the aforesaid third and fourth sheet members are aligned and each of the aforesaid fourth sheet members is placed between the aforesaid second sheet members with the aforesaid fourth sheet members aligned at the same locations as the cutout portions of the aforesaid second sheet members in a laminating direction and with the overlapping portions of the aforesaid fourth sheet members jutting out further beyond the end portions of the aforesaid third sheet members. This rotating electric machine armature core is characterized in that the same is configured by combining the aforesaid first and second magnetic tooth sections with the overlapping portions of the aforesaid second magnetic tooth sections fitted in the corresponding cutout portions of the aforesaid first magnetic tooth section.

This structure makes it possible to achieve an improvement in the efficiency of assembly work for fixedly joining separate elements into a single body without requiring difficult machining even when the core size is reduced.

BEST MODES FOR CARRYING OUT THE INVENTION

Now, best modes for carrying out the present invention are described in the following with reference to the drawings.

FIRST EMBODIMENT

Figure 1:
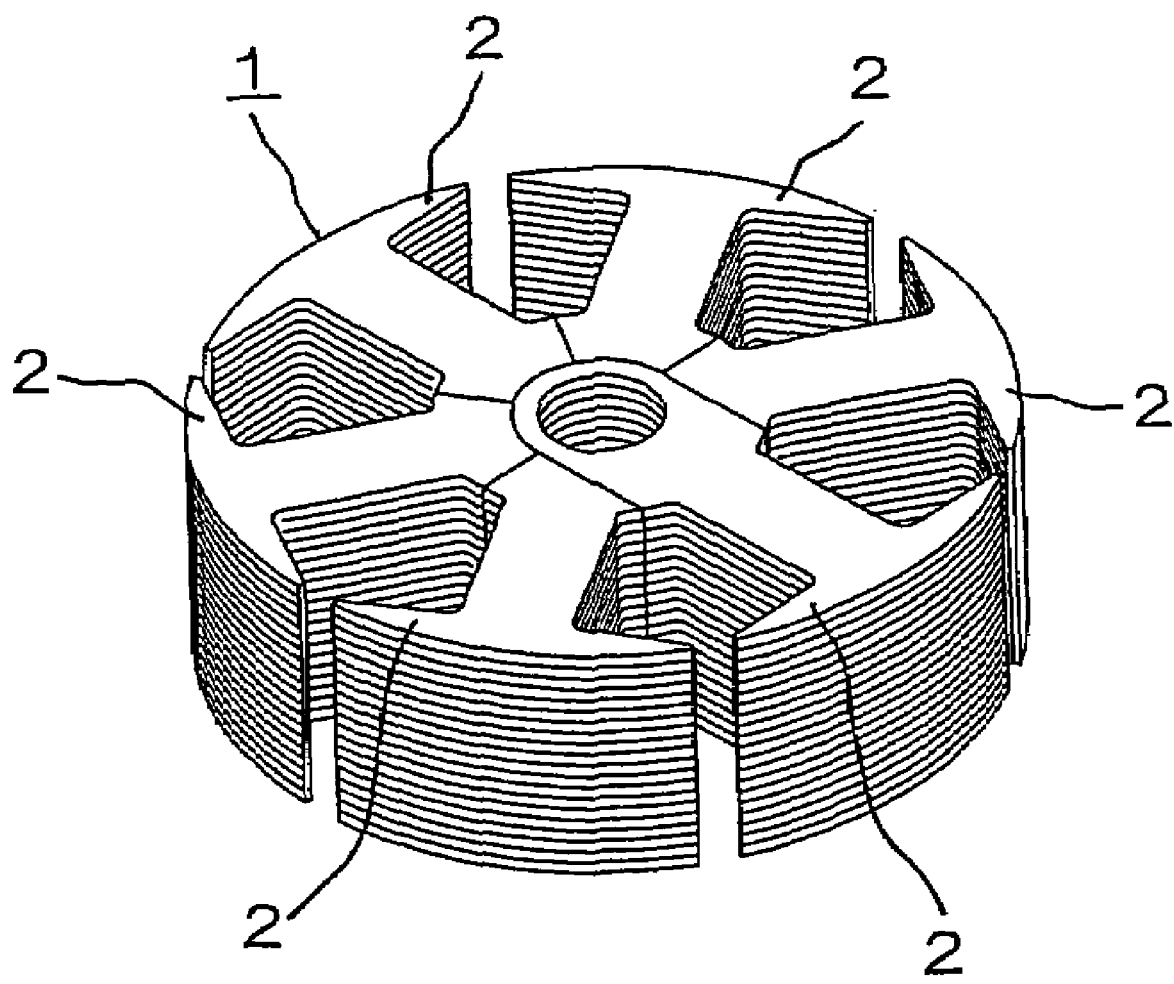
FIG. 1 is a perspective view showing the structure of a rotating electric machine armature core according to a first embodiment of this invention.
Figure 2:
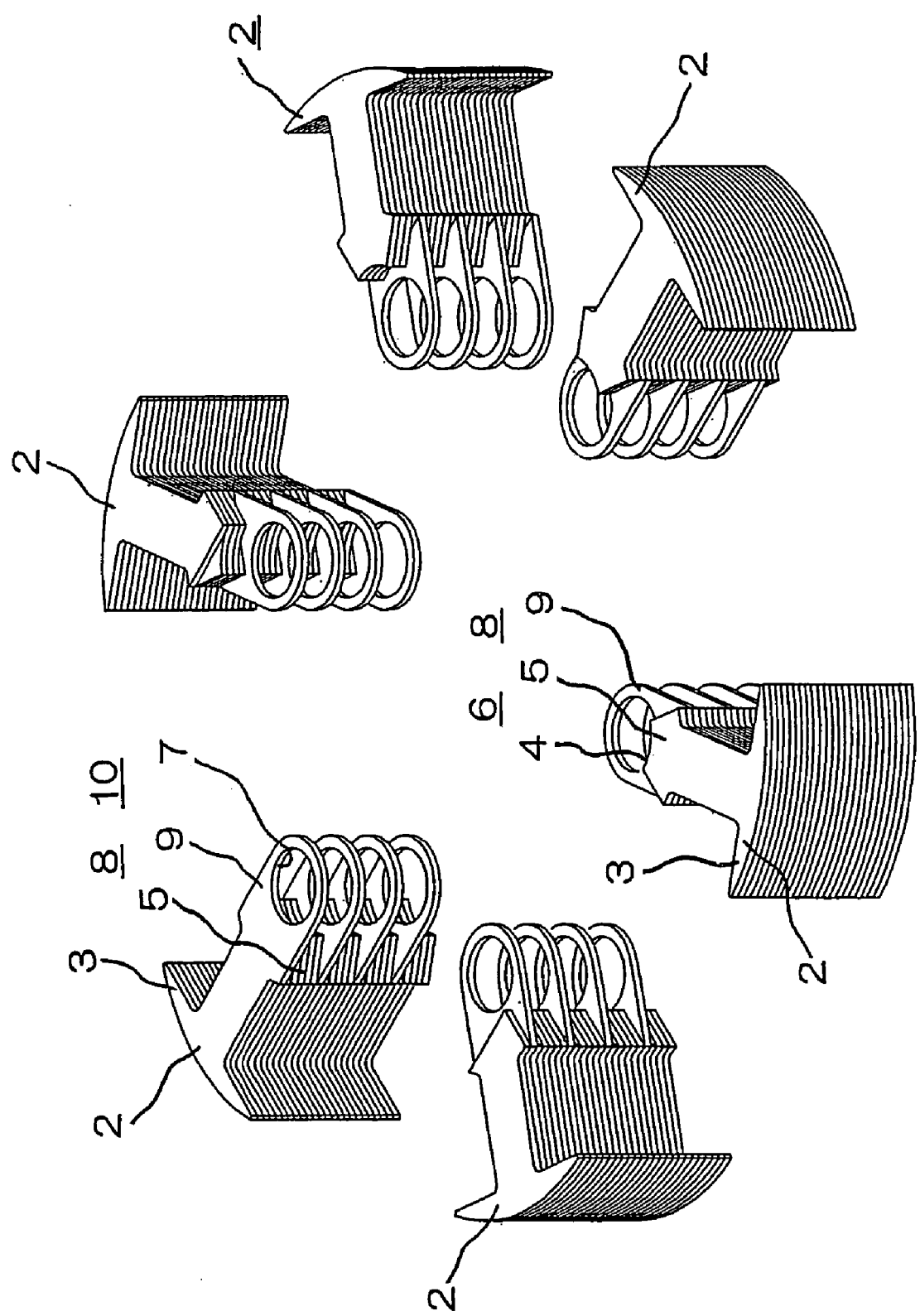
FIG. 2 is an exploded perspective view showing the rotating electric machine armature core of FIG. 1.
Figure 3:
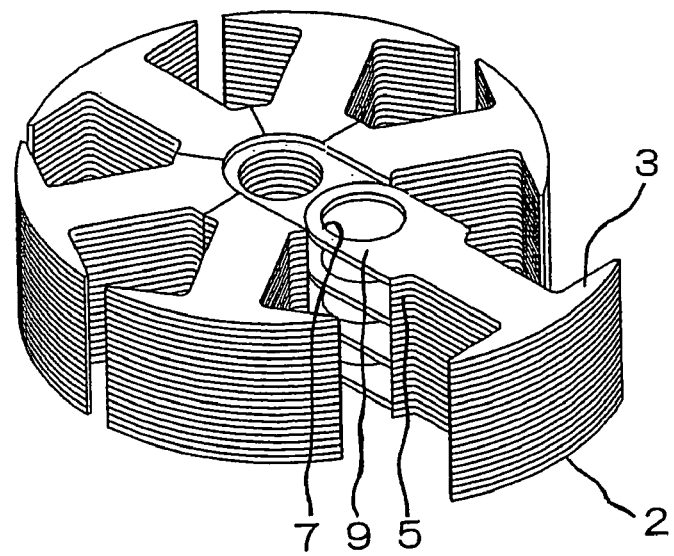
FIG. 3 is a perspective view showing a state in which one of magnetic tooth sections of the rotating electric machine armature core of FIG. 1 has been detached.
Figure 4:
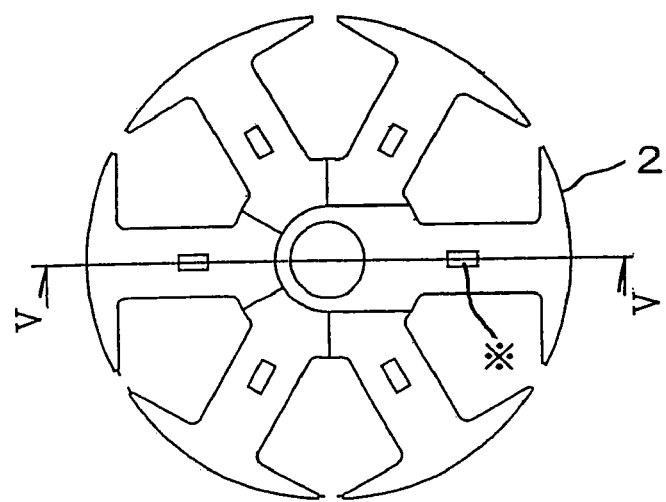
FIG. 4 is a plan view showing the rotating electric machine armature core of FIG. 1.
Figure 5:
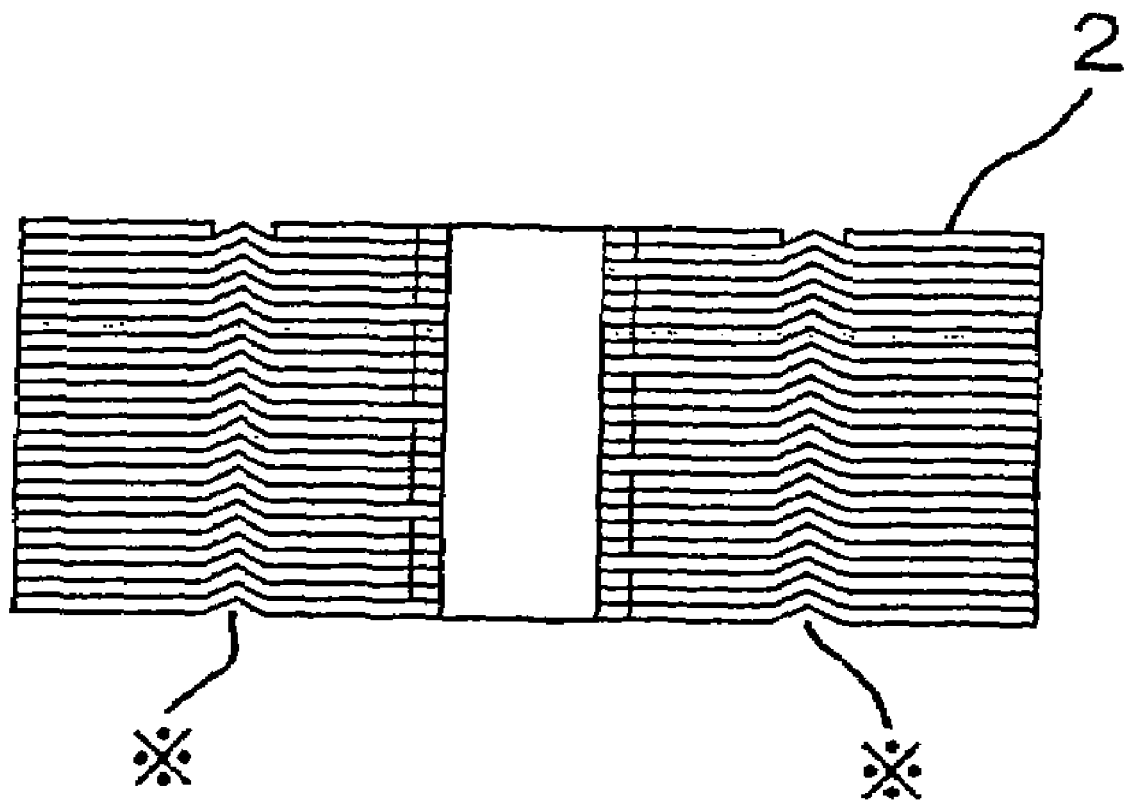
FIG. 5 is a cross-sectional view showing a cross section taken along a line V-V of FIG. 4.
Figure 6:
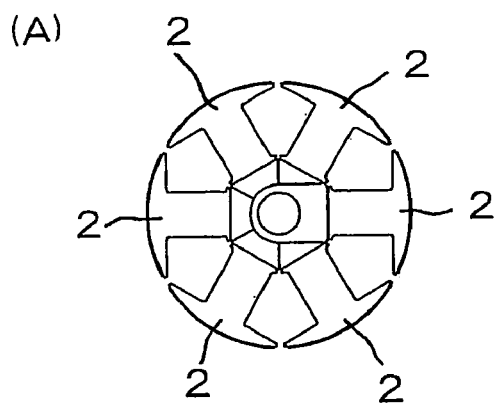
FIG. 6 is a diagram showing a process of winding coils on the rotating electric machine armature core of FIG. 1.
Figure 6:
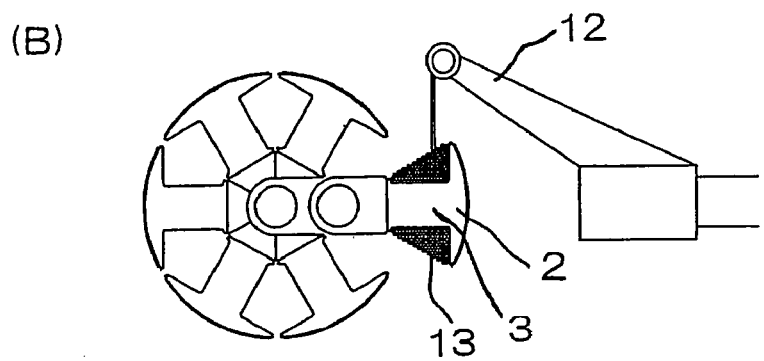
Figure 6:
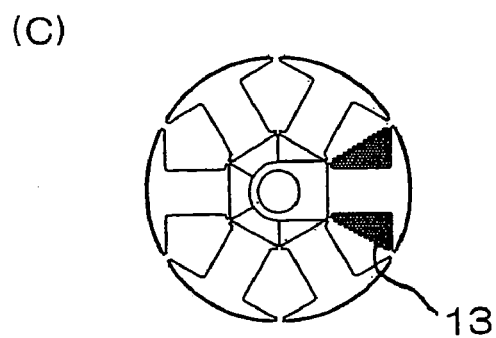
Figure 6:
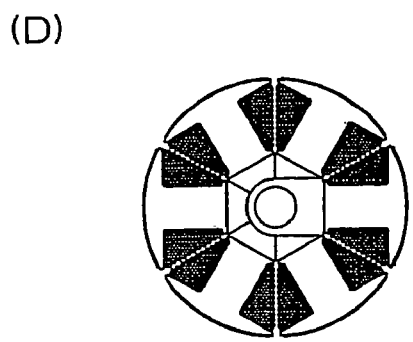
Figure 7:
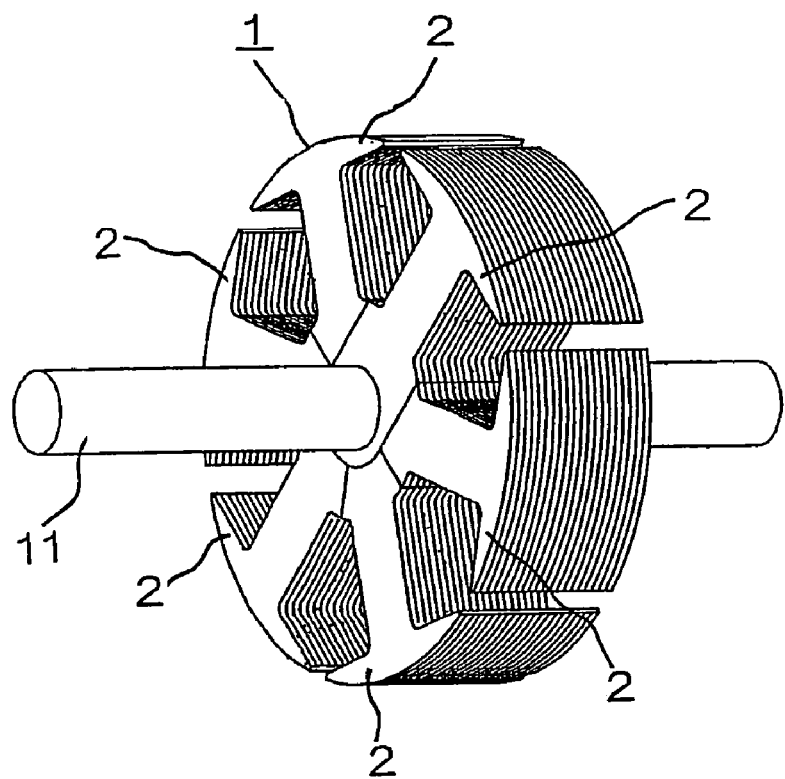
FIG. 7 is a perspective view showing an example in which the magnetic tooth sections of the rotating electric machine armature core of FIG. 1 have been fixedly combined into a single body by forcibly inserting a rotary shaft.
Figure 8:
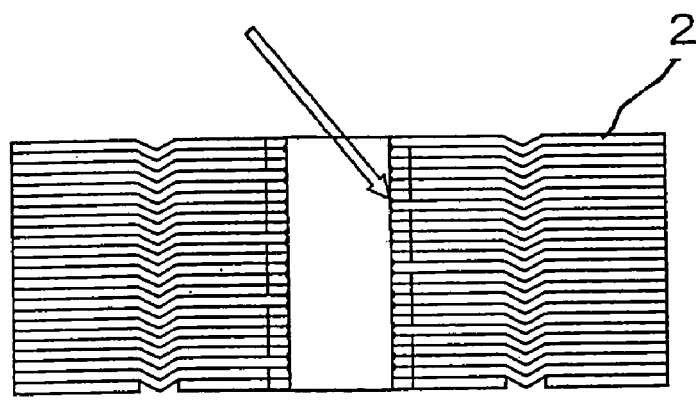
FIG. 8 is a cross-sectional view showing an example in which the rotating electric machine armature core sections of FIG. 1 have been fixedly combined into a single body by welding.

FIG. 1 is a perspective view showing the structure of an armature core of a rotating electric machine according to a first embodiment of this invention, FIG. 2 is an exploded perspective view showing the rotating electric machine armature core of FIG. 1, FIG. 3 is a perspective view showing a state in which one of magnetic tooth sections of the rotating electric machine armature core of FIG. 1 has been detached, FIG. 4 is a plan view showing the rotating electric machine armature core of FIG. 1, FIG. 5 is a cross-sectional view showing a cross section taken along a line V-V of FIG. 4, FIG. 6 is a diagram showing a process of winding coils on the rotating electric machine armature core of FIG. 1, FIG. 7 is a perspective view showing an example in which the magnetic tooth sections of the rotating electric machine armature core of FIG. 1 have been fixedly combined into a single body by forcibly inserting a rotary shaft, and FIG. 8 is a cross-sectional view showing an example in which the rotating electric machine armature core sections of FIG. 1 have been fixedly combined into a single body by welding.

The rotating electric machine armature core 1 of the first embodiment is configured by combining such a number of magnetic tooth sections 2 that corresponds to the number of magnetic poles in a radial form as shown in FIG. 1.

Each of the magnetic tooth sections 2 includes first sheet members 6 and at least one second sheet member 10 inserted between the first sheet members 6 in a laminating direction thereof at a location different from the locations of the other magnetic tooth sections 2. Each of the first sheet members 6 includes a magnetic tooth portion 3 formed at one end and a root portion 5 formed at the other end with an end face 4 of the root portion 5 having a prescribed external shape (arch shape as illustrated). The second sheet member 10 includes a magnetic tooth portion 3 formed at one end and an overlapping portion 9 formed at the other end, wherein the overlapping portion 9 forms a back yoke portion 8 together with a root portion 5 with a through hole 7 formed at a specified position in the overlapping portion 9, the overlapping portion 9 jutting out from the root portion 5 in such a fashion that the overlapping portion 9 can fit on the end faces 4 of the root portions 5 of the pertinent first sheet members 6.

The individual magnetic tooth sections 2 structured as described above are fixedly combined into a single body by crimping the magnetic tooth sections 2 at specified locations marked by asterisks (*) in FIGS. 4 and 5.

Next, the magnetic tooth sections 2 are combined in a radial form, centering on the individual overlapping portions 9, in such a way that the through holes 7 of the individual overlapping portions 9 are aligned with one another, and end faces of the individual overlapping portions 9 fit on the end faces 4 of the root portions 5 of the other magnetic tooth sections 2 as shown in FIGS. 2 and 3. Then, as shown in FIG. 7, the individual magnetic tooth sections 2 are joined into a single body by forcibly fitting the rotary shaft 11 into the through holes 7, whereby the rotating electric machine armature core 1 is completed.

In a stage preceding the process of combining the individual magnetic tooth sections 2 into a single body by forcibly fitting the rotary shaft 11, each of the individual magnetic tooth sections 2 is pulled out in a radial direction from a state shown in FIG. 6(A) and subjected to coil-winding operation performed by a coil winding machine 12 as shown in FIG. 6(B) to wind a coil 13 around the magnetic tooth portion 3 as shown in FIG. 6(C). Subsequently, the coils 13 are successively wound on the remaining magnetic tooth sections 2 as shown in FIG. 6(D).

In the foregoing first embodiment, the individual magnetic tooth sections 2 are structured as discussed above, such a number of magnetic tooth sections 2 that corresponds to the number of magnetic poles are combined in a radial form in such a way that locations of the individual through holes 7 of the overlapping portions 9 align one another, centering on a side where the overlapping portions 9 are formed, and the individual magnetic tooth sections 2 are fixedly combined into a single body by forcibly fitting the rotary shaft 11 into the through holes 7 in the individual overlapping portions 9. Therefore, it is possible to achieve an improvement in the efficiency of assembly work for fixedly joining separate elements into a single body without requiring difficult machining even when the core size is reduced.

While the aforementioned structure allows for an improvement in the assembly work efficiency by forcibly fitting the rotary shaft 11 into the individual through holes 7 in the overlapping portions 9 to fixedly combine the individual magnetic tooth sections 2, the invention is not limited to this structure. As an alternative, it is possible to achieve an improvement in the assembly work efficiency by fixedly joining the individual magnetic tooth sections 2 by welding the same from an inner periphery side of the individual through holes 7 as shown by an arrow in FIG. 8.

SECOND EMBODIMENT

Figure 9:
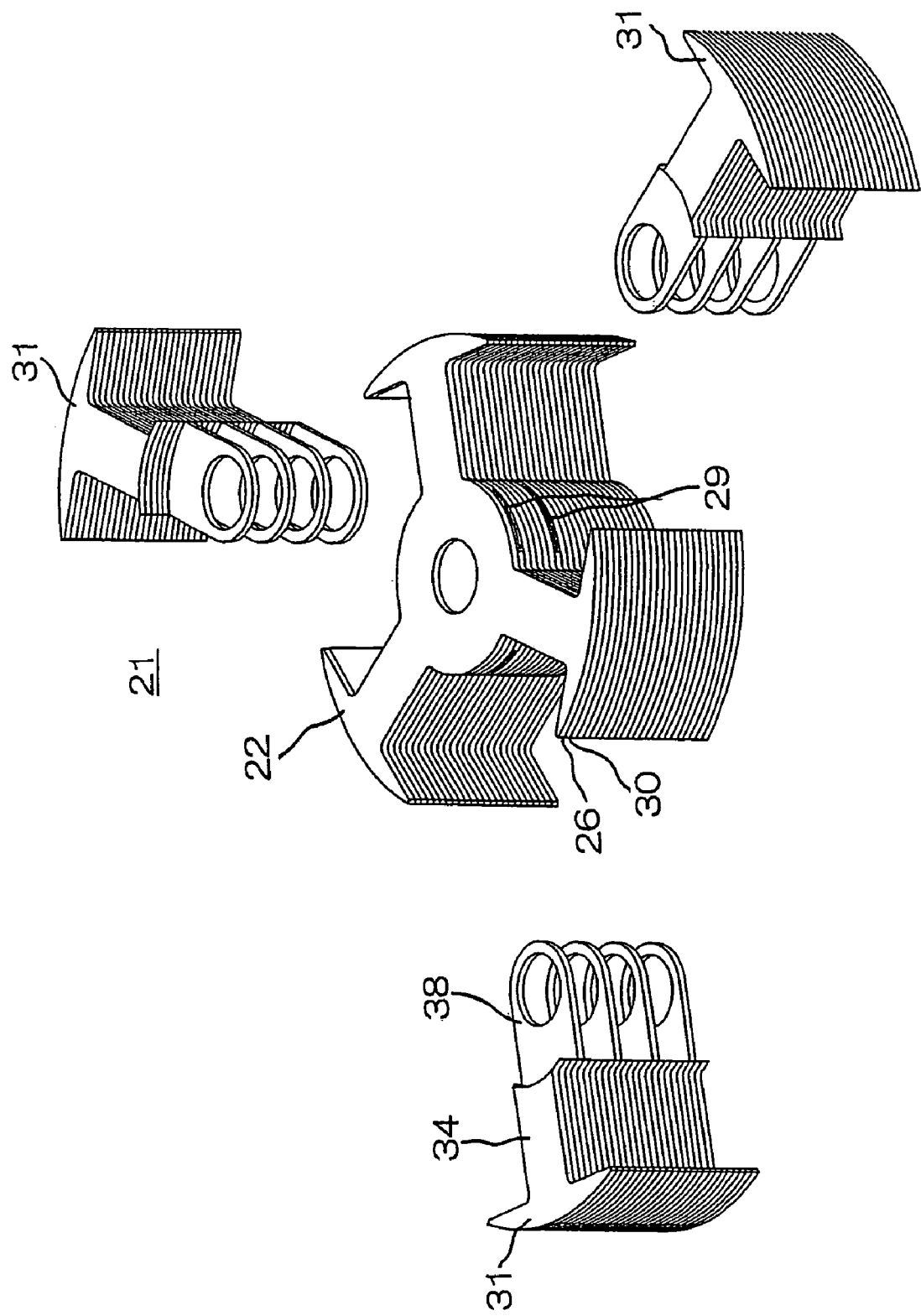
FIG. 9 is an exploded perspective view showing the structure of a rotating electric machine armature core according to a second embodiment of this invention.
Figure 10:
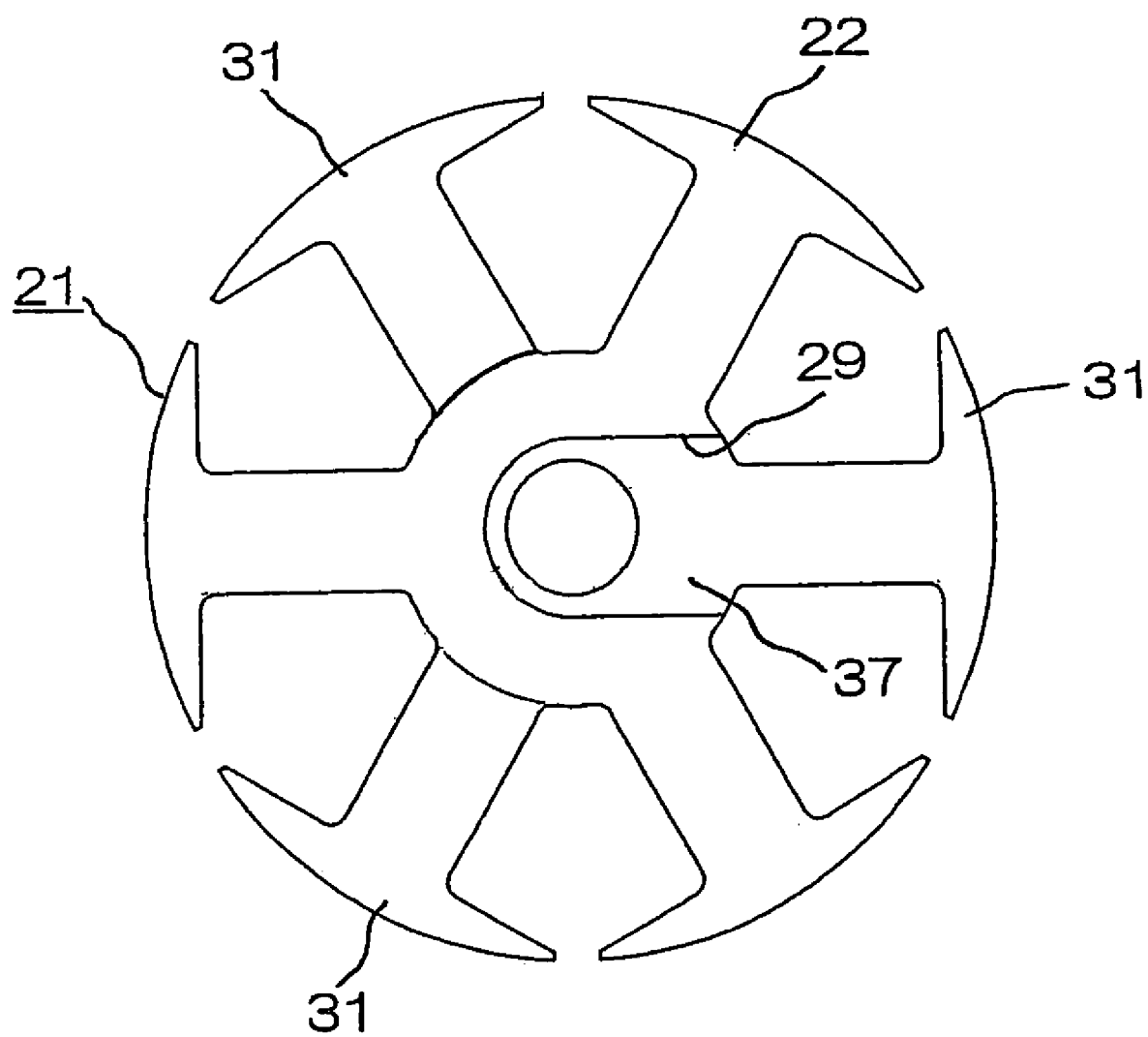
FIG. 10 is a fragmentary cross-sectional view showing the structure of a principal part of the rotating electric machine armature core of FIG. 9.

A rotating electric machine armature core 21 according to a second embodiment of this invention is configured by combining a first magnetic tooth section 22 disposed at a central position and a plurality of second magnetic tooth sections 31 disposed in surrounding areas of the first magnetic tooth section 22 as shown in FIG. 9. FIG. 10 is a fragmentary cross-sectional view showing the structure of a principal part of the rotating electric machine armature core of FIG. 9.

Figure 11:
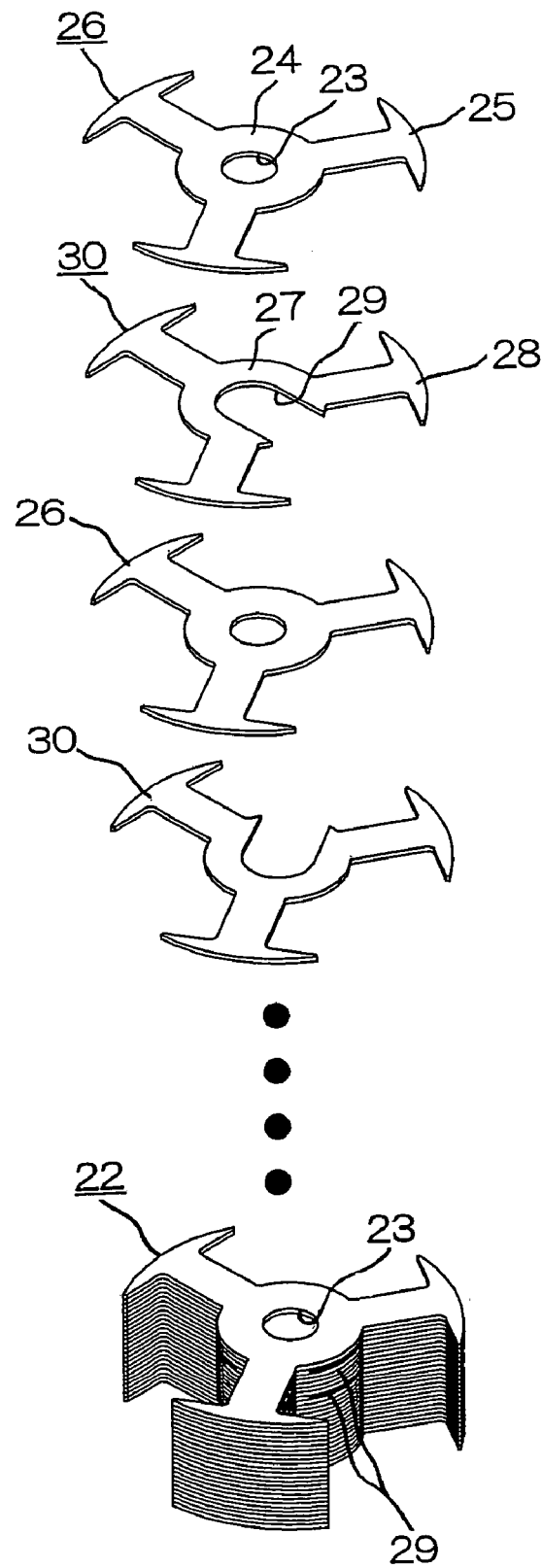
FIG. 11 is a perspective view showing a process of manufacturing a first magnetic tooth section shown in FIG. 9.

The first magnetic tooth section 22 is configured by laminating specific numbers of first sheet members 26 and second sheet members 30 as shown in FIG. 11. Each of the first sheet members 26 includes a ring like portion 24 having a through hole 23 at a central part and a plurality of magnetic tooth portions 25 formed to extend from around this ring like portion 24 at specific intervals along a circumferential direction. Each of the second sheet members 30 has the second sheet member 30 which includes a second ring like portion 27, a plurality of magnetic tooth portions 28 formed to extend from around this second ring like portion 27 at the same intervals as the magnetic tooth portions 25 of the first sheet member 26 along the circumferential direction, and a cutout portion 29 opening outward at a middle position along the circumferential direction between adjacent two of the magnetic tooth portions 28, the cutout portion 29 being formed by cutting out a central part of the second ring like portion 27 over an area larger than the through hole 23 formed in the first sheet member 26. The first sheet members 26 and the second sheet members 30 are laminated in such a manner that the individual magnetic tooth portions 25, 28 are aligned and the cutout portion 29 of the second sheet member 30 exists at least at one location between the adjacent magnetic tooth portions 25, 28.

Figure 12:
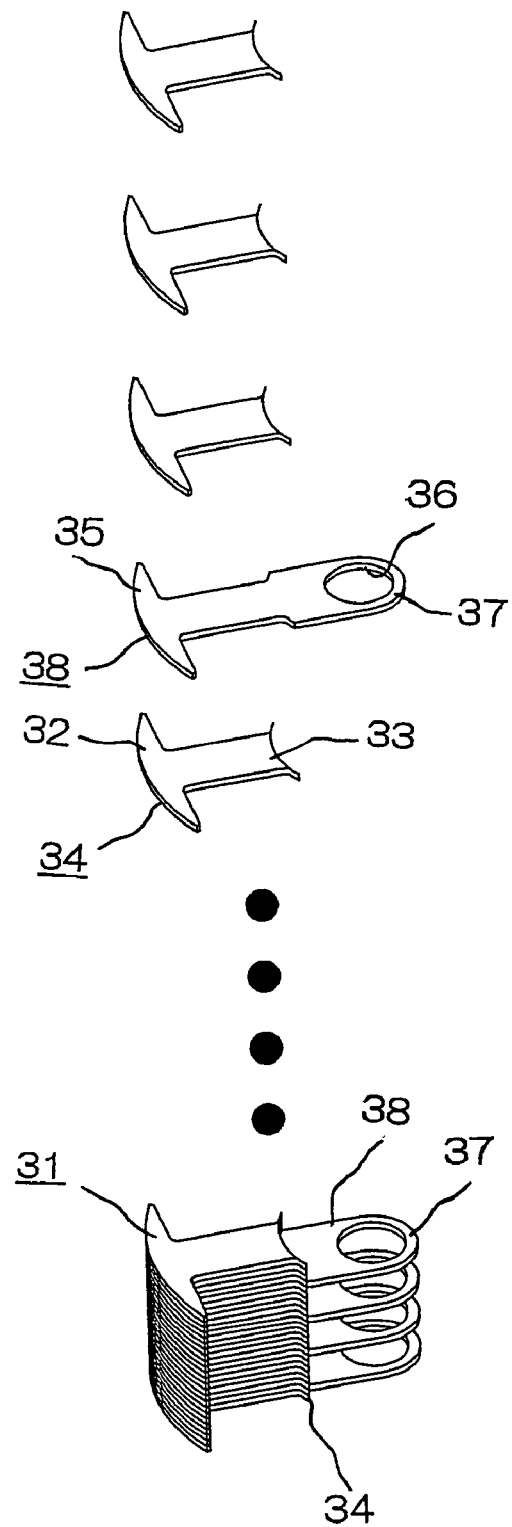
FIG. 12 is a perspective view showing a process of manufacturing a second magnetic tooth section shown in FIG. 9.

The second magnetic tooth section 31 is configured by laminating specific numbers of third sheet members 34 and fourth sheet members 38 as shown in FIG. 12. Each of the third sheet members 34 includes a magnetic tooth portion 32 formed at one end and an end portion 33 formed at the other end, the end portion 33 being capable of fitting on an outer peripheral surface of the ring like portion 24 of the relevant first sheet member 26. Each of the fourth sheet members 38 includes a magnetic tooth portion 35 formed at one end and an overlapping portion 37 formed at the other end with a through hole 36 formed at a specified position in the overlapping portion 37, the overlapping portion 37 being capable of fitting in the cutout portion 29 of the relevant second sheet member 30. The third sheet members 34 and the fourth sheet members 38 are laminated in such a manner that the individual magnetic tooth portions 32, 35 are aligned and each of the fourth sheet members 38 is placed between the second sheet members 30 with the fourth sheet members 38 aligned at the same locations as the cutout portions 29 of the second sheet members 30 in their laminating direction and with the overlapping portions 37 of the fourth sheet members 38 jutting out further beyond the end portions 33 of the third sheet members 34.

The first magnetic tooth section 22 and the second magnetic tooth sections 31 thus configured are combined by fitting the overlapping portions 37 of the second magnetic tooth sections 31 in the corresponding cutout portions 29 of the first magnetic tooth section 22 such that the through holes 23, 36 on both sides are aligned together. Then, although not illustrated, the first magnetic tooth section 22 and the individual second magnetic tooth sections 31 are joined into a single body by forcibly fitting a rotary shaft into the through holes 23, 36 or by welding the first magnetic tooth section 22 and the individual second magnetic tooth sections 31 from an inner periphery side of the individual through holes 23, 36, whereby the rotating electric machine armature core 21 is completed.

In a stage preceding the process of combining the second magnetic tooth sections 31 with the first magnetic tooth section 22 to form a single body, coils are wound around the individual magnetic tooth portions 25, 28 and 32, 35 of both types of magnetic tooth sections 22, 31 in the same way as in the first embodiment.

In the foregoing second embodiment, the first and second magnetic tooth sections 22, 31 are structured as discussed above and are fixedly joined into a single body with the overlapping portions 37 of the second magnetic tooth sections 31 fitted in the cutout portions 29 of the corresponding second sheet members 30 such that the through holes 36 in the overlapping portions 37 are aligned with the through holes 23 in the first sheet members 26. Therefore, it is possible to achieve an improvement in the efficiency of assembly work for fixedly joining separate elements into a single body without requiring difficult machining even when the core size is reduced.

THIRD EMBODIMENT

Figure 13:
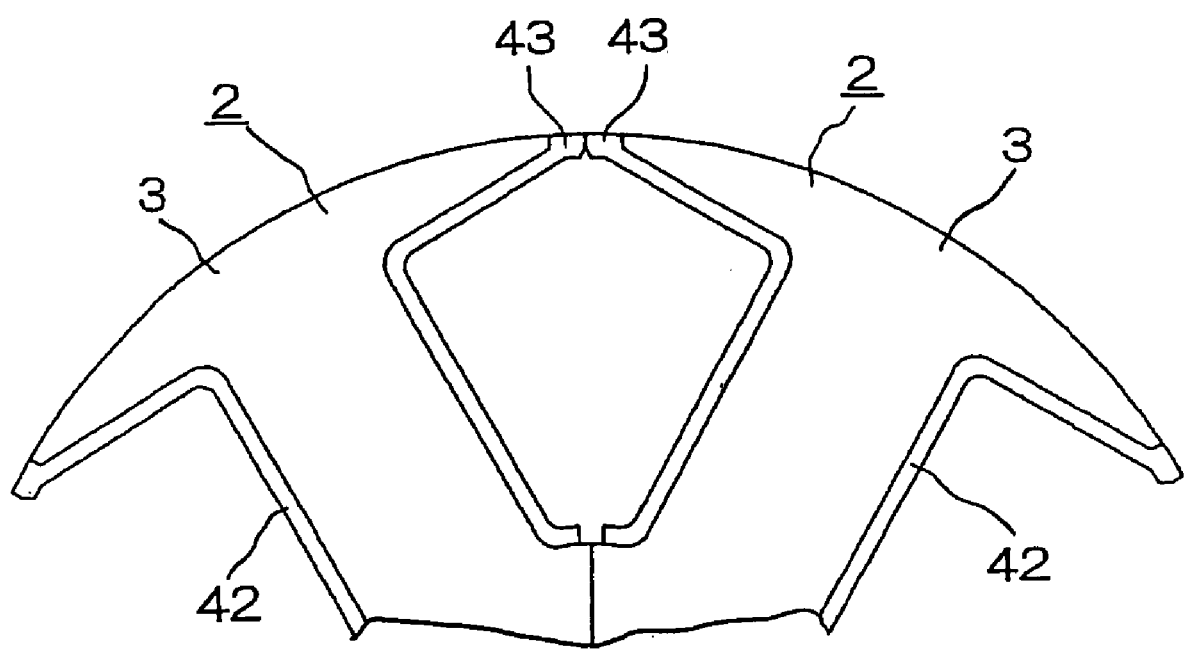
FIG. 13 is a fragmentary cross-sectional view showing the structure of a principal part of a rotating electric machine armature core according to a third embodiment of this invention.

FIG. 13 is a fragmentary cross-sectional view showing the structure of a principal part of a rotating electric machine armature core according to a third embodiment of this invention, in which elements similar to those of the aforementioned first embodiment are designated by the same reference numerals and a description of such elements is omitted.

The rotating electric machine armature core of the third embodiment of this invention is configured in such a manner that surfaces of individual magnetic tooth sections 2 are covered with molding resin 42 and extreme end parts 43 of a magnetic tooth portion 3 of each magnetic tooth section 2 extend so that a slot opening between extreme ends of one magnetic tooth portion 3 and another is closed. The aforementioned structure makes it possible to decrease windage loss by reducing passage flow resistance of air gaps and thereby increase the efficiency of a rotating electric machine.

INDUSTRIAL APPLICABILITY

As thus far discussed, the present invention provides a rotating electric machine armature core which makes it possible to achieve an improvement in the efficiency of assembly work for fixedly joining separate elements into a single body, the rotating electric machine armature core offering a wide range of applications.

The invention claimed is:

1. A rotating electric machine armature core comprising a number of magnetic tooth sections that corresponds to the number of magnetic poles, each of said magnetic tooth sections being formed by laminating a specific number of sheet members each of which has a magnetic tooth portion formed at one end and a back yoke portion formed at the other end, said magnetic tooth sections being combined in a radial form centering on said other end and fixedly joined together to form a single body, each of said magnetic tooth sections including:
   a plurality of first sheet members each of which includes said magnetic tooth portion formed at one end and a root portion formed at the other end with an end face of the root portion having a prescribed external shape; and
   at least one second sheet member inserted between individual first sheet members in a laminating direction thereof at a location different from the locations of said other sheet members, said second sheet member including said magnetic tooth portion formed at one end and an overlapping portion formed at the other end, the overlapping portion forming said back yoke portion together with said root portion with a through hole formed at a specified position in the overlapping portion, the overlapping portion jutting out from said root portion in such a manner that the overlapping portion can fit on the end face of the root portion of said first sheet member;
   wherein said rotating electric machine armature core is configured by combining said magnetic tooth sections with the through holes in said individual overlapping portions aligned at the same location.

2. The rotating electric machine armature core according to claim 1, wherein said magnetic tooth sections are fixedly joined to together form a single body by forcibly fitting a rotary shaft into said individual through holes.

3. The rotating electric machine armature core according to claim 1, wherein the same is configured by using molding resin as an insulating material to cover said magnetic tooth portions in such a manner that parts of said molding resin extend to close a slot opening between extreme ends of one magnetic tooth portion and another.

4. The rotating electric machine armature core according to claim 1, wherein
   said magnetic tooth sections are fixedly joined to together form a single body by forcibly fitting a rotary shaft into said individual through holes, and
   the same is configured by using molding resin as an insulating material to cover said magnetic tooth portions in such a manner that parts of said molding resin extend to close a slot opening between extreme ends of one magnetic tooth portion and another.

* * * * *